May 15, 1951 M. PAUL 2,552,906

TELEPHONE SET SHOULDER CLAMP

Filed Dec. 17, 1948

INVENTOR.
MILTON PAUL
BY
Laforest S. Saulsbury
ATTORNEY

Patented May 15, 1951

2,552,906

UNITED STATES PATENT OFFICE 2,552,906

TELEPHONE SET SHOULDER CLAMP

Milton Paul, Great Neck, N. Y.

Application December 17, 1948, Serial No. 65,789

1 Claim. (Cl. 179—157)

This invention relates to a telephone set shoulder clamp.

It is an object of the present invention to provide a telephone set shoulder clamp whereby a telephone set can be held to the ear and mouth from the shoulder without the necessity of having to adjust the head into clamping engagement with the telephone set upon it being disposed between the head and shoulder and wherein the device is in the form of a clamp with a resilient portion adapted to engage the rear of the shoulder, the forward and top part of the shoulder and extending at an angle toward the bottom of the neck and at the rear thereof.

Other objects of the present invention are to provide a telephone set shoulder clamp or rest which is of simple construction, convenient to use and easily adapted to the shoulder, adjustable on the telephone set to the different neck size of the individual using the shoulder clamp, inexpensive to manufacture, compact and consumes little space when the telephone set is on the base, and efficient in operation.

For other objects and for a better understanding of the invention, reference may be had to the following detailed description taken in connection with the accompanying drawing, in which Fig. 1 is a perspective view of one form of the clamp embodying the features of the present invention arranged on the shoulder of a person and having the telephone set secured thereto.

Figures 1, 2, 3, 4, 5, 6:
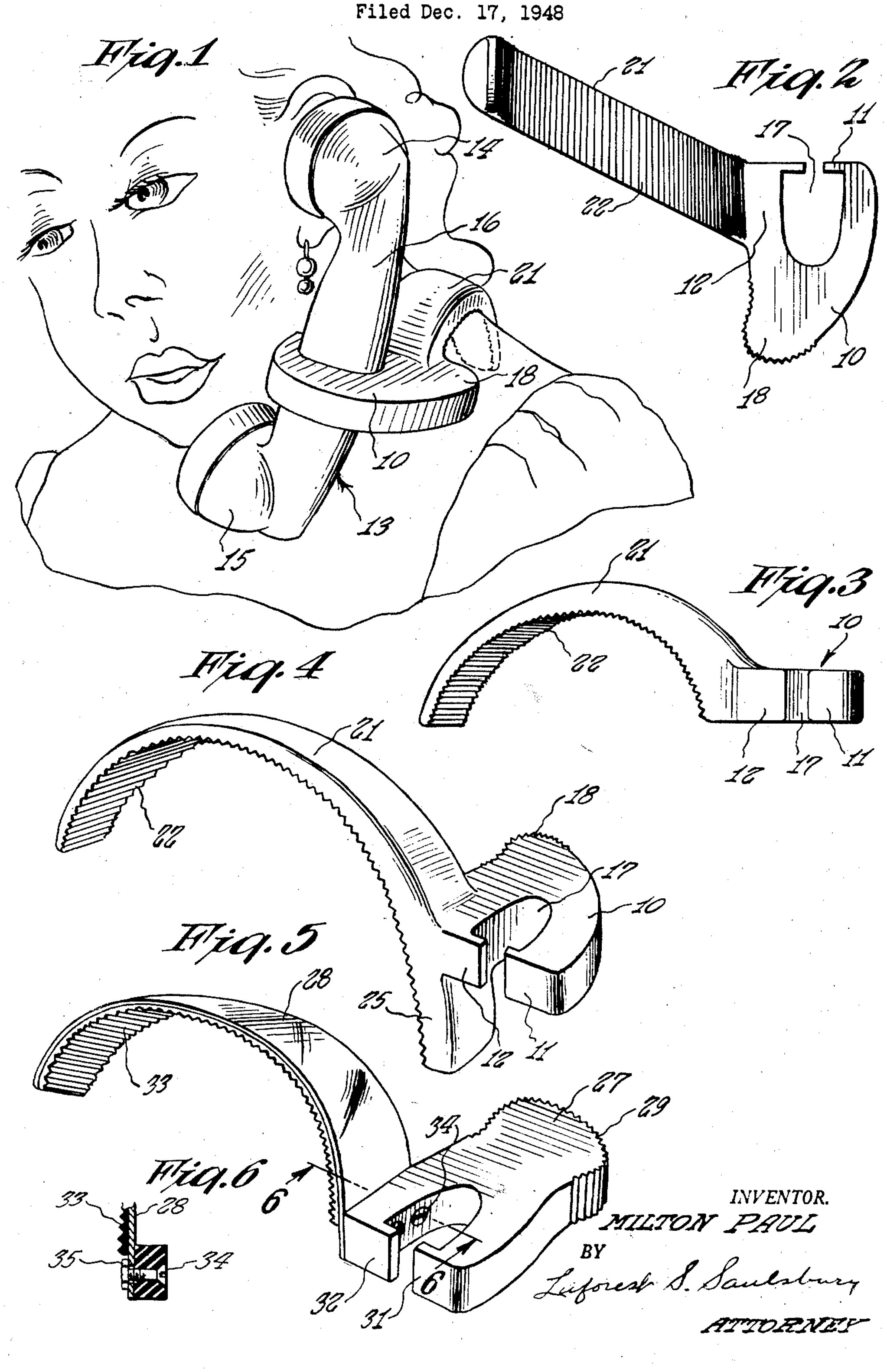
Fig. 2 is a bottom plan view of the clamp shown in Fig. 1.
Fig. 3 is a side elevational view.
Fig. 4 is a perspective view of a modified form of clamp wherein the clamping portion extends below the gripping portion.
Fig. 5 is a perspective view of a still further form of the invention wherein the clamping portion is formed of spring metal and has a rubber gripping face and the gripping portion is connected to the clamping portion by fastening elements.
Fig. 6 is a fragmentary sectional view taken on line 6—6 of Fig. 5.

Referring now particularly to Figs. 1, 2 and 3, 10 represents a gripping portion having jaws 11 and 12 adapted to fit about and have clamping and clinching engagement with a telephone set 13. This telephone set 13 has the usual receiver 14 and a transmitter 15. Between the receiver and the transmitter is a connecting portion 16 which enters opening 17 between the jaws 11 and 12. On the rear end of the gripping portion 10 is a vertically serrated projection 18.

Extending upwardly from the gripping portion and inclined forwardly therefrom is a resilient clamping portion 21 adapted to be draped about the shoulder and neck to have clamping engagement with the shoulder to hold the shoulder clamp in place thereon along with the telephone set. This clamping portion is serrated on its bottom face to have better gripping action with the clothing on the shoulder. These serrations are indicated at 22. The clamping portion, in addition to extending at an inclined angle forwardly of the gripping portion, is skewed so that its forward edge can be elevated onto the raising portion of the neck.

In applying the shoulder clamp to the shoulder, the clamp with the telephone set is extended first to a rearward position so that the end of the clamping portion 21 engages the rear of the shoulder and then the clamp and telephone set is brought forwardly in a draping manner. In applying the clamp, the receiver portion 14 of the telephone set will be brought to the ear and the transmitter 15 will be automatically brought to the proper location at the mouth.

In Fig. 4, there is provided an extension 25 of the clamp portion so that the clamp portion can lie well downwardly over the front of the shoulder and below the gripping portion 10. This extension 25 is serrated in order to provide for a good gripping surface throughout the entire extent of the clamp portion.

In Figs. 5 and 6, there is shown a shoulder clamp formed of separable gripping and clamping portions 27 and 28. The gripping portion 27 is serrated as indicated at 29 to provide good engagement with the forward part of the shoulder and has jaws 31 and 32 which are separable from one another to receive the connecting portion 16 of the telephone set to grip the same.

The clamping portion 28 is formed of a flexible metal piece bent and fashioned in such a manner that a draping action can be effected with it upon placing the clamp over the shoulder. This clamping portion is skewed in order to elevate its inner edge and so that the under surface of the clamping portion will fit upon the raising neck of the user of the telephone set. The metal piece is provided with an inner layer 33 of serrated rubber in order that the clamping portion will be comfortable upon the shoulder and will have good gripping action with the clothing and shoulder.

The metal clamping portion is secured to the jaw 32 of the gripping portion 27 by fastening screws 34 and nuts 35.

The projection 18 of the gripping portion 10 is laterally offset from the jaws 11 and 12 and extends in such a manner as to support the telephone set upon the front of the shoulder in such a manner that slipping outwardly on the shoulder is prohibited. The offset projection lies well under the phone set so as to provide a good balance point for the telephone set and in such a manner that the telephone set will fall toward the ear and the clamping or cramping action of the neck of the user is unnecessary to maintain the telephone set upon the shoulder. A favorable result can be had with the gripping portion acting almost singly to support the telephone set and with the clamping portion 21 free of the back of the shoulder or back of the user.

It should now be apparent that there has been provided a telephone set shoulder clamp which can be attached to the shoulder and the telephone set held in place without the necessity of having to bend the neck toward the shoulder to retain the set.

It should also be apparent that the clamping portion is so shaped and connected with the gripping portion 10 that the clamping portion will be inclined toward the neck and can be draped over the back of the same. The telephone set can be placed on the telephone base without interference from the clamp and the clamping portion by being inclined from the gripping portion and will be extended down the rear of the telephone set base at substantially the same angle thereof and will not protrude vertically so as to interfere with the motion of the arms of a person using the desk on which the telephone is located.

While various changes may be made in the detail construction, it shall be understood that such changes shall be within the spirit and scope of the present invention as defined by the appended claim.

What is claimed is:

A telephone set shoulder clamp comprising a gripping portion having jaws adapted to be extended about the telephone set for a rigid connection therewith, an arcuate clamping portion of resilient material extending laterally from one of the jaws of the gripping portion in a vertical direction and adapted to be draped over the lower part of the neck and shoulder and the end thereof to engage the back of the user, said gripping portion having a projection extending laterally for engagement with the forward part of the shoulder, said arcuate clamping portion extending at an angle from the gripping portion inclined toward the neck and forwardly of one of the jaws, said arcuate clamping portion being skewed to flushly raise the edge of the clamping portion adjacent the neck so as to fit the lower part of the neck on a bias.

MILTON PAUL.

REFERENCES CITED

The following references are of record in the file of this patent:

UNITED STATES PATENTS

| Number | Name | Date |
|---|---|---|
| D. 150,821 | Bianchi | Sept. 7, 1948 |
| 2,243,554 | Epstein | May 27, 1941 |
| 2,294,989 | Keely | Sept. 8, 1942 |
| 2,348,138 | Latus | May 2, 1944 |
| 2,476,221 | Renneker | July 12, 1949 |